US006932063B1

(12) United States Patent
Hu

(10) Patent No.: US 6,932,063 B1
(45) Date of Patent: Aug. 23, 2005

(54) INTERNAL EGR COOLER

(75) Inventor: Haoran Hu, Novi, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/916,659

(22) Filed: Aug. 12, 2004

(51) Int. Cl.$^7$ .............................................. F02B 47/08
(52) U.S. Cl. .............................. 123/568.14; 123/568.15
(58) Field of Search ...................... 123/568.14, 568.13, 123/568.12, 568.15, 568.17, 184.33

(56) References Cited

U.S. PATENT DOCUMENTS

| 4,258,687 | A   |   | 3/1981  | Mauch et al. |            |
|-----------|-----|---|---------|--------------|------------|
| 4,267,812 | A   |   | 5/1981  | Aula et al.  |            |
| 5,546,914 | A   | * | 8/1996  | Scheinert    | 123/568.14 |
| 6,170,474 | B1  | * | 1/2001  | Israel       | 123/568.14 |
| 6,360,732 | B1  |   | 3/2002  | Bailey et al.|            |
| 6,543,411 | B2  | * | 4/2003  | Raab et al.  | 123/305    |
| 6,742,506 | B1  | * | 6/2004  | Grandin      | 123/568.12 |
| 6,807,937 | B2  | * | 10/2004 | Gianolio et al. | 123/308 |
| 2003/0140876 | A1 |   | 7/2003  | Yang et al.  |            |

* cited by examiner

Primary Examiner—Mahmoud Gimie
(74) Attorney, Agent, or Firm—Paul V. Keller

(57) ABSTRACT

One aspect of the invention relates to cooled internal EGR. Cooled internal EGR is achieved by selectively admitting exhaust to an intake manifold. A heat exchanger is used to cool the exhaust within the intake manifold. Another aspect of the invention related to an intake manifold adapted for internal EGR cooling. The manifold has a bulge to retain exhaust, whereby the exhaust admitted to the intake side for internal EGR generally does not flow past the intake manifold and significantly heat or foul any upstream portion of the system. The manifold further includes a heat exchanger for cooling the exhaust. A further aspect of the invention relates to a method of reducing the response time of an EGR system. The method comprises providing a temporary increase in an internal EGR rate during a transition from a first to a second external EGR rate.

21 Claims, 3 Drawing Sheets

INTERNAL EGR COOLER

FIELD OF THE INVENTION

The present invention relates generally to internal combustion engines and more particularly to exhaust gas recirculation systems for controlling NOx emissions from diesel engines.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting those regulations. In conventional gasoline powered vehicles that use stoichiometric fuel-air mixtures, three-way catalysts have been shown to control $NO_x$ emissions. In diesel powered vehicles and vehicles with lean-burn gasoline engines, however, the exhaust is too oxygen-rich for three-way catalysts to be effective.

Several solutions have been proposed for controlling NOx emissions from diesel powered vehicles and lean-burn gasoline engines. One set of approaches remove NOx from the vehicle exhaust. These include the use of lean-burn $NO_x$ catalysts, $NO_x$ adsorber-catalysts, and selective catalytic reduction (SCR). These methods are promising, but have associated costs in terms of equipment and often a fuel penalty. Complementary approaches focus on limiting NOx formation by the engine.

NOx formation can be limited by avoiding high combustion temperatures. Methods of avoiding high combustion temperatures include retarding the ignition timing, cooling intake air, and reducing the oxygen concentration through exhaust gas recirculation (EGR). Retarding the ignition timing makes combustion less efficient, and therefore has a fuel penalty. Cooling the intake air is helpful, but does not lower the temperature to the desired degree.

EGR can reduce NOx production. It is typically used selectively according to engine operation conditions (torque and speed). Generally speaking, there are two types of EGR, external EGR (sometimes referred to as cooled EGR) and internal EGR (sometimes referred to as non-cooled EGR). External EGR includes high pressure EGR and low pressure EGR. High pressure EGR involves recirculating exhaust drawn from a high pressure portion of the exhaust stream. Generally, a high pressure portion of the exhaust stream is a portion upstream of a turbine placed in the exhaust stream to drive an intake air turbo charger. Low pressure EGR involves drawing exhaust from a low pressure portion of the exhaust stream, such as a portion downstream of a turbine. Low pressure EGR requires a pump or compressor to pressurize the exhaust. External EGR systems normally include a heat exchanger to reduce the temperature of the recirculated exhaust to improve the volumetric efficiency of the engine. A heat exchanger is typically placed at the point from which the exhaust is drawn and typically uses engine coolant as a cooling medium.

U.S. Pat. No. 4,267,812 describes an EGR cooler for use in conjunction with an external EGR system. The cooler is said to be more compact than conventional EGR coolers, and is designed for mounting on an intake manifold with little or no modification to the intake manifold.

Internal EGR is achieved through valve timing. Internal EGR usually involves opening an exhaust valve during an intake stroke, whereby exhaust is drawn into the cylinder from the exhaust manifold. Internal EGR can also be achieved by early exhaust valve closing, which leaves a portion of the exhaust in the cylinder at the end of an exhaust stroke. A further method of achieving internal EGR is to open an intake valve during an exhaust stroke, whereby exhaust flows into the intake manifold, however, this approach is generally avoided because it results in heating of the intake manifold, which in turn heats the intake air, increasing its volume and disrupting the fuel-air ratio.

There continues to be a long felt need for better ways of limiting NOx emissions from diesel engines.

SUMMARY OF THE INVENTION

The following presents a simplified summary in order to provide a basic understanding of some aspects of the invention. This summary is not an extensive overview of the invention. The primary purpose of this summary is to present some concepts of the invention in a simplified form as a prelude to the more detailed description that is presented later.

One aspect of the invention relates to cooled internal EGR. Cooled internal EGR is achieved by selectively admitting exhaust to an intake manifold and cooling the exhaust within the intake manifold. Variable valve timing can be used to control the amount of internal exhaust gas recirculation. A heat exchanger can be used to cool the exhaust within the intake manifold.

Another aspect of the invention related to an intake manifold adapted for internal EGR cooling. The manifold has a bulge to retain exhaust, whereby the exhaust admitted to the intake side for internal EGR generally does not flow past the intake manifold and significantly heat or foul parts upstream of the intake manifold. The manifold further includes a heat exchanger for cooling the exhaust.

A further aspect of the invention relates to a method of improving the responsiveness of an EGR system. The method comprises providing a temporary increase in an internal EGR rate during a transition from a first to a second external EGR rate.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the detailed description in conjunction with the drawings.

DETAILED DESCRIPTION OF THE INVENTION

Figure 1:
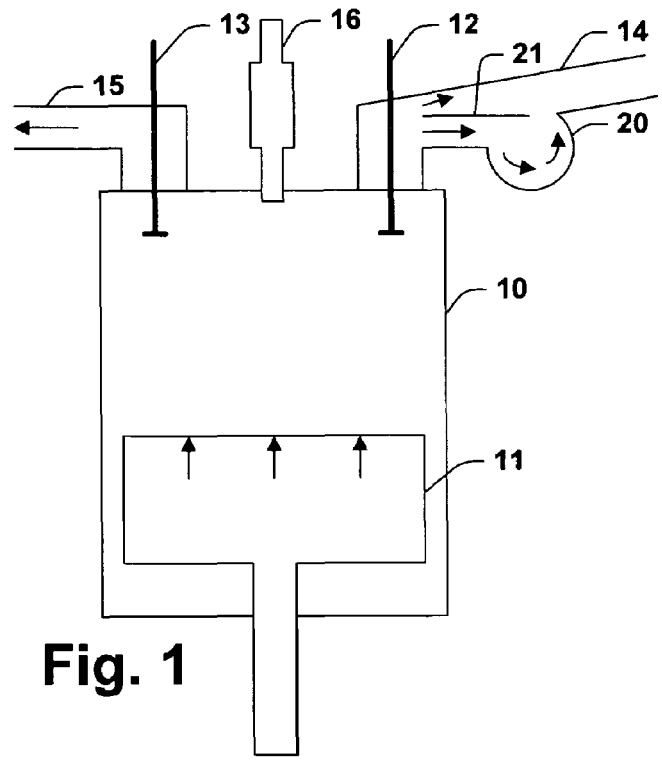
FIG. 1 illustrates a cylinder of an exemplary engine according to one aspect of the invention in the midst of an exhaust stroke.
Figure 2:
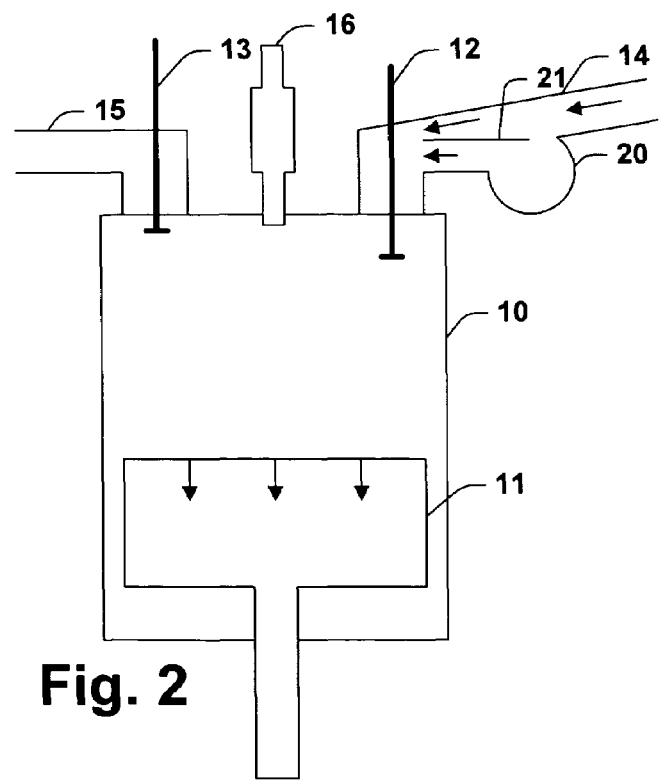
FIG. 2 illustrates the cylinder of FIG. 1 in the midst of an intake stroke.

FIG. 1 illustrates a cylinder 10 of an exemplary engine according to one aspect of the invention in the midst of an exhaust stroke. The cylinder 10 has a piston 11, an intake valve 12, an exhaust valve 13, an intake manifold 14, an exhaust manifold 15, and a fuel injector 16. According to the invention, the intake valve 12 is open during a portion of the exhaust stroke, generally during the early part of the exhaust stroke. Opening the intake valve during the exhaust stroke causes exhaust to flow into the intake manifold 14 where the exhaust mixes with fresh air and is cooled. Cooling may occur before, during, or after mixing. FIG. 2 illustrates the cylinder 10 during an intake stroke. Exhaust released into the intake manifold 14, cooled and mixed with intake air, is drawn into the cylinder 10.

The intake manifold 14 preferably includes a bulge 20. A bulge can be any swelling of the intake manifold to a size beyond that which is dictated by its function of channeling air to one or more cylinders without significantly increasing the pressure drop along the intake path. A bulge does not have to be a clearly identifiable portion of the intake manifold 14. Preferably, the intake manifold 14 with its bulge 20 has at least enough volume to retain as much as exhaust as the engine is designed to release directly to the intake manifold 14, whereby the exhaust does not travel upstream of the intake manifold 14.

Preferably, the vehicle is designed to internally recirculate exhaust representing at least about one quarter of each cylinder volume, more preferably at least about one third of each cylinder volume. The intake manifold 14 is sized to accommodate the peak volume of internally recirculated exhaust.

The intake manifold 14 can serve all or just a portion of the engine's cylinders. If all the cylinders served by the intake manifold 14 have different timings and the vehicle is designed to internally recirculate exhaust corresponding to up to one third of each cylinder volume, the bulge 20 provides a volume of at least about one third of a single cylinder volume. If the cylinders are 1000 cc, this would be at least about 350 cc. If two cylinders served by the intake manifold 14 are on the same timing, then the bulge 20 provides a volume of at least about two thirds of a single cylinder volume.

More preferably, the intake manifold 14 with its bulge 20 is not only large enough to hold all the recirculated exhaust but also to hold the exhaust while mixing it with intake air. Preferably, the total volume is at least two times the maximum volume of exhaust the vehicle is designed to release directly to the intake manifold 14. A long mixing time between internally recirculated exhaust and intake air is a potential advantage of the present invention.

In one embodiment, the intake manifold 14 is divided into two channels such that intake air flows primarily through one channel and exhaust releasing to the intake manifold 14 flows primarily through the other channel. The intake manifold 14 has a separator 21 that creates two channels. Optionally, the intake manifold 14 has a turbine to promote circulation and cooling within the intake manifold 14.

Figure 3:
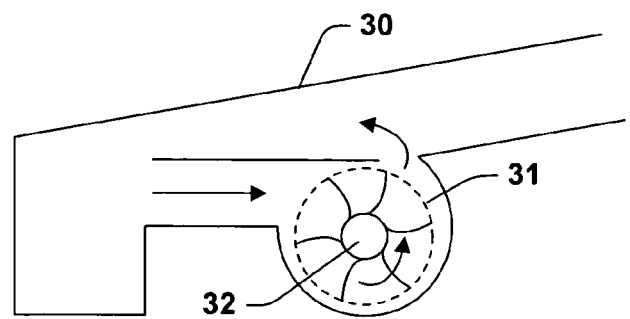
FIG. 3 illustrates an intake manifold according to one embodiment of the invention.

FIG. 3 illustrates an intake manifold 30 having a turbine 31 to promote cooling and mixing. The turbine 31 can be driven by exhaust flowing from the intake manifold 14, in which case the turbine 31 can be used as an auxiliary power source. Alternatively, the turbine 31 can be driven in any suitable fashion. Cooling can be provided by a coolant flowing through the axis 32 of the turbine 31 or in any other suitable fashion, including a heat exchanger separate from the turbine 31.

The intake manifold 14 is adapted to actively cool the exhaust. Active cooling is cooling going beyond the incidental cooling that results from heat uptake by the body of the intake manifold 14, heat exchange with charge air, and incidental heat loss to the surroundings in the absence of specific structures to promote heat transfer. Active cooling can involve structures to promote heat exchange, such as fins, and/or circulation of a coolant. Preferably, cooling reduces the temperature of the exhaust, but does not reduce it to a point where water condenses (about 100° C.).

Preferably, cooling the exhaust involves forced circulation of a cooling fluid in heat exchange contact with the intake manifold 14. Forced circulation means using a fan or pump to induce circulation of a cooling fluid. Any cooling fluid can be used, including for example engine coolant, a heating fluid for a passenger compartment, or ambient air. Preferably the cooling fluid is a liquid such as engine coolant.

Figure 4:
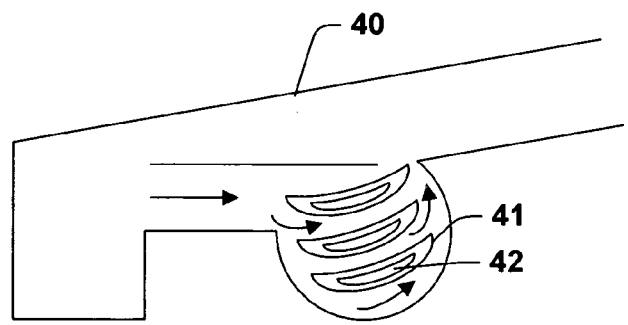
FIG. 4 illustrates an intake manifold according to another embodiment of the invention.
Figure 5:
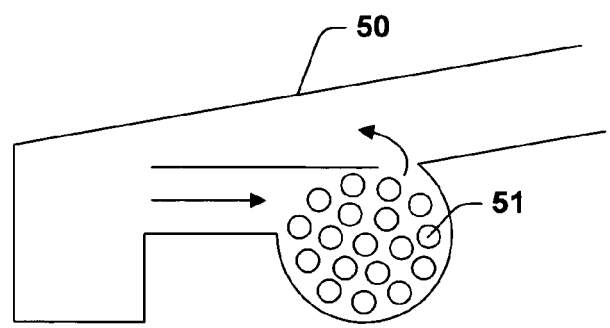
FIG. 5 illustrates an intake manifold according to a further embodiment of the invention.

The intake manifold 14 can be provided with a heat exchanger. A heat exchanger can involve cooling fins and or passages through which coolant travels. FIG. 4 illustrates an intake manifold 40 having cooling fins 41. The cooling fins 41 optionally include passages 42 for a cooling fluid. FIG. 5 illustrates an intake manifold 50 having tubes 51 through which a cooling fluid flows.

In order to provide sufficient cooling without condensing water, a control system may be provided for a heat exchanger used in association with intake manifold 14. Control may involve measuring a temperature within or on the intake manifold 14 using a suitable temperature measuring device. A suitable temperature measuring device could be, for example, a thermocouple, a resistance temperature detector, or a thermistor. The cooling rate can be controlled in response to the measurement by adjusting a coolant flow rate, for example. Feedback control is typically a combination of proportional, integral, and/or differential control. Feed forward control can also be used, in which case a temperature measuring device may not be required.

In contrast to high pressure external EGR, which is generally only effective at low engine torque and steady operation, internal EGR can be provided during any engine operating condition. Nevertheless, internal EGR is typically provided selectively and in varying degrees based on engine speed-torque conditions. Optionally, internal EGR is combined with external EGR. In such a case, internal EGR may be used primarily during warm up and transient operating conditions.

During warm-up, internal EGR can improve engine heating in comparison to external EGR. For this purpose, it is desireable to suspend or avoid internal EGR cooling. Internal EGR cooling can be avoided during warm-up by recirculating the exhaust to the exhaust manifold side.

External EGR has a slow response time in comparison to internal EGR. In one aspect of the invention, an internal EGR system can be used over an external EGR system's response period to maintain a target EGR rate during the response period.

Internal and external EGR rates are generally adjusted through electronically controlled valves, which in turn can be operated by a vehicle's electronic control unit (ECU).

Figure 6:
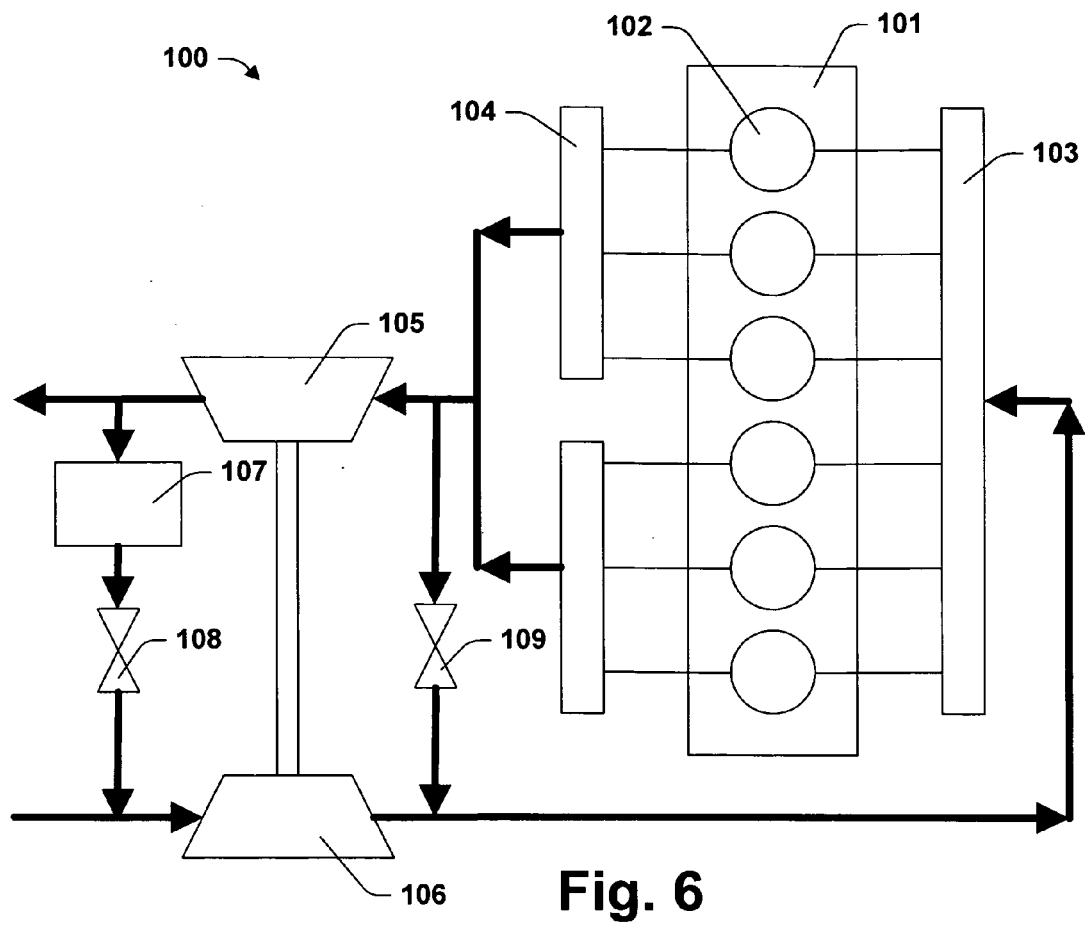
FIG. 6 illustrates a vehicle having high and low pressure EGR systems.

An external EGR system can be either a low pressure external EGR system or a high pressure external EGR system. FIG. 6 illustrates a vehicle 100 with options for both low pressure and high preesure EGR, as well as a system for cooled internal EGR. The vehicle 100 comprises engine 101 having cylinders 102, intake manifold 103, exhaust manifolds 104, turbine 105, compressor 106, catalytic diesel particulate filter (CDPF) 107, low pressure EGR valve 108, and high pressure EGR valve 109. Exhaust from exhaust manifolds 104 drives the turbine 105, which in turn drives the compressor 106, which pressurizes charge air. High pressure EGR valve 109 admits exhaust from a high pressure portion of the exhaust stream to combine with charge air and can be used whenever the exhaust pressure is sufficiently higher than the charge air pressure. Low pressure EGR valve 108 can admit exhaust from any portion of the exhaust stream to the compressor, provided the exhaust is treated by the CDPF 107. Low pressure EGR can be used at any time. Providing both high and low pressure EGR and using high pressure EGR instead of low pressure EGR when possible can increase the lifetimes of the CDPM 107 and the compressor 106.

High and low pressure EGR systems normally include coolers near their corresponding EGR valves, however, according to one aspect of the invention, the internal EGR cooler is designed with a high cooling capacity and externally recirculated exhaust is cooled primarily or exclusively in the intake manifold. In another embodiment, the EGR cooler has a smaller capacity, in which an external EGR system has a separate cooler and external EGR is used when large volumes of EGR are required.

Low pressure EGR is preferred over high pressure EGR. High pressure EGR can only be used when the exhaust manifold pressure is sufficiently high in comparison with the intake manifold pressure. High pressure EGR is particularly problematic during high torque operation. Low pressure EGR, on the otherhand, can be used at any time. One embodiment of the invention combines low pressure external EGR with a cooled internal EGR system.

Variable valve timing is used to control the amount of internal EGR. Variable valve timing can be achieved by any suitable mechanism. In a cam-less engine, the valve timing is electronically controlled and can be freely selected. In a system with a cam, any number of mechanisms are available for adjusting the timing, including for example, mechanisms for selecting a portion of the cam driving a rocker arm that lifts the valve and mechanisms for creating an offset in the mechanical system running from the cam to the valve.

Figure 7:
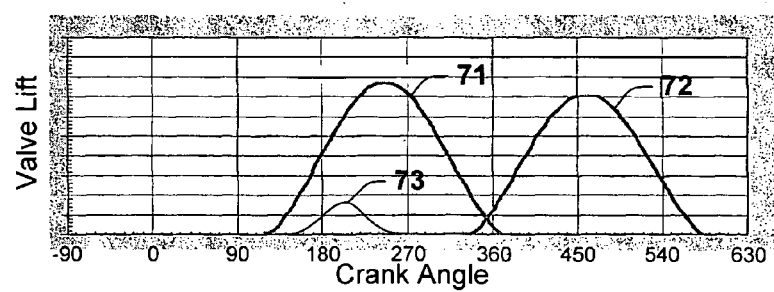
FIG. 7 is a plot of valve timing for a preferred embodiment of the invention.

FIG. 7 is a plot of valve lift versus crank angle for a preferred valve timing according to the present invention. The curve 71 illustrates the primary exhaust valve opening and the curve 72 illustrates the primary intake valve opening. The curve 73 illustrates a supplemental intake valve opening that occurs during the exhaust stroke to admit exhaust directly into the intake manifold for internal EGR. Any suitable mechanism can be used to selectively implement the valve timing of FIG. 7.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

What is claimed is:

1. A method of limiting NOx emissions from a compression ignition diesel internal combustion engine, comprising:
    opening an intake valve of a cylinder of the engine during an exhaust stoke of the cylinder to release exhaust gas from the engine to an intake manifold for the engine;
    actively cooling the exhaust within the intake manifold; and
    drawing the exhaust back into the engine;
    wherein active cooling is cooling going beyond the cooling that results from warming the intake manifold, mixing of the exhaust with intake air, and heat loss to the surroundings in the absence of specific structures to promote heat transfer; and
    the exhaust has a convention diesel engine exhaust composition in the sense that the exhaust does not have a composition that could cause pre-ignition prior to fuel injection, even in the absence of cooling.

2. The method of claim 1, wherein actively cooling the exhaust comprises forcing circulation of a cooling fluid that exchanges heat with the exhaust within the intake manifold.

3. The method of claim 1, wherein actively cooling the exhaust within the intake manifold comprises cooling the exhaust with engine coolant.

4. The method of claim 1, wherein the intake manifold is designed to retain exhaust released directly from the engine into the intake manifold.

5. The method of claim 1, further comprising mixing intake air with the exhaust while the exhaust is in the intake manifold.

6. The method of claim 5, further comprising providing the engine with an intake manifold designed to retain exhaust released directly into the intake manifold and large enough to hold the exhaust while it mixes with the intake air.

7. A method of limiting NOx emissions from an internal combustion engine, comprising:
    selectively providing internal EGR according to claim 1; and
    selectively providing external EGR.

8. The method of claim 7, wherein exhaust recirculated by the external EGR is primarily cooled within the intake manifold.

9. The method of claim 7, wherein the external EGR is low pressure EGR.

10. A power generation system, comprising:
    a compression ignition diesel engine having variable valve timing;
    an intake manifold coupled to the engine; and
    a heat exchanger operative to cool the contents of the intake manifold, wherein;
    the power generation system is adapted to use variable valve timing to admit exhaust gas directly into the intake manifold for internal exhaust gas recirculation and the heat exchanger is adapted to cool the exhaust gas prior to its reentry to the engine; and
    the engine is not configured to pre-mix fuel and air.

11. The power generation system of claim 10, further comprising an external EGR system.

12. The power generation system of claim 11, wherein the external EGR system comprises a low pressure EGR system.

13. The power generation system of claim 12, wherein the low pressure EGR system comprises a diesel particulate filter.

14. The power generation system of claim 11, wherein the power generation system is configured to cool the externally recirculated exhaust primarily within the intake manifold.

15. The power generation system of claim 10, wherein the heat exchanger is cooled by engine coolant.

16. The power generation system of claim 10, wherein the intake manifold defines an enclosed volume adapted to retain the internally recirculated exhaust.

17. The power generation system of claim 16, wherein the volume of the intake manifold is adapted to retain both the internally recirculated exhaust and an equal volume of charge air for mixing with the exhaust.

18. An intake manifold for cooled internal EGR, comprising:
   a body shaped to channel intake air to a plurality of cylinders;
   a bulge in the body adapted to retain exhaust received directly from the cylinders during internal EGR; and
   a heat exchanger configured to cool exhaust within the body
   wherein the bulge creates a volume of at least about 350 cc within the intake manifold, the volume being unnecessary for channeling exhaust to the cylinders and the elimination of which would not significantly affect intake air flow rates to the cylinders in the absence of internal EGR.

19. An intake manifold for cooled internal EGR, comprising:
   a body shaped to channel intake air to a plurality of cylinders;
   a bulge in the body adapted to retain exhaust received directly from the cylinders during internal EGR; and
   a heat exchanger configured to cool exhaust within the body
   wherein the intake manifold comprises a first channel through which intake air primarily flows and a second channel through which exhaust primarily flows as it exits the engine.

20. A method of reducing the response time of an EGR system for an engine, comprising:
   warming up the engine;
   setting a first rate of external EGR;
   resetting the rate of external EGR to a second, higher rate;
   providing a temporary increase in an internal EGR rate during a transition period between the first and second external EGR rate;
   whereby the temporary increase in the internal EGR rate functions to reduce the effective response time of the EGR system.

21. The method of claim 20, wherein resetting a rate of external EGR consists essentially of making one adjustment to a position of an EGR valve.

* * * * *